May 23, 1933.  F. CONRAD  1,911,062
ELECTRIC CLOCK
Filed March 17, 1927  7 Sheets-Sheet 1

WITNESSES:

INVENTOR
Frank Conrad.
BY
ATTORNEY

May 23, 1933.    F. CONRAD    1,911,062
ELECTRIC CLOCK
Filed March 17, 1927    7 Sheets-Sheet 2

WITNESSES:

INVENTOR
Frank Conrad.
BY
ATTORNEY

May 23, 1933.   F. CONRAD   1,911,062
ELECTRIC CLOCK
Filed March 17, 1927   7 Sheets-Sheet 3

WITNESSES:

INVENTOR
Frank Conrad.
BY
ATTORNEY

May 23, 1933.                F. CONRAD                1,911,062
                           ELECTRIC CLOCK
                    Filed March 17, 1927      7 Sheets-Sheet 4

WITNESSES:

INVENTOR
Frank Conrad.
BY
ATTORNEY

May 23, 1933.                F. CONRAD                1,911,062
                            ELECTRIC CLOCK
                       Filed March 17, 1927        7 Sheets-Sheet 5
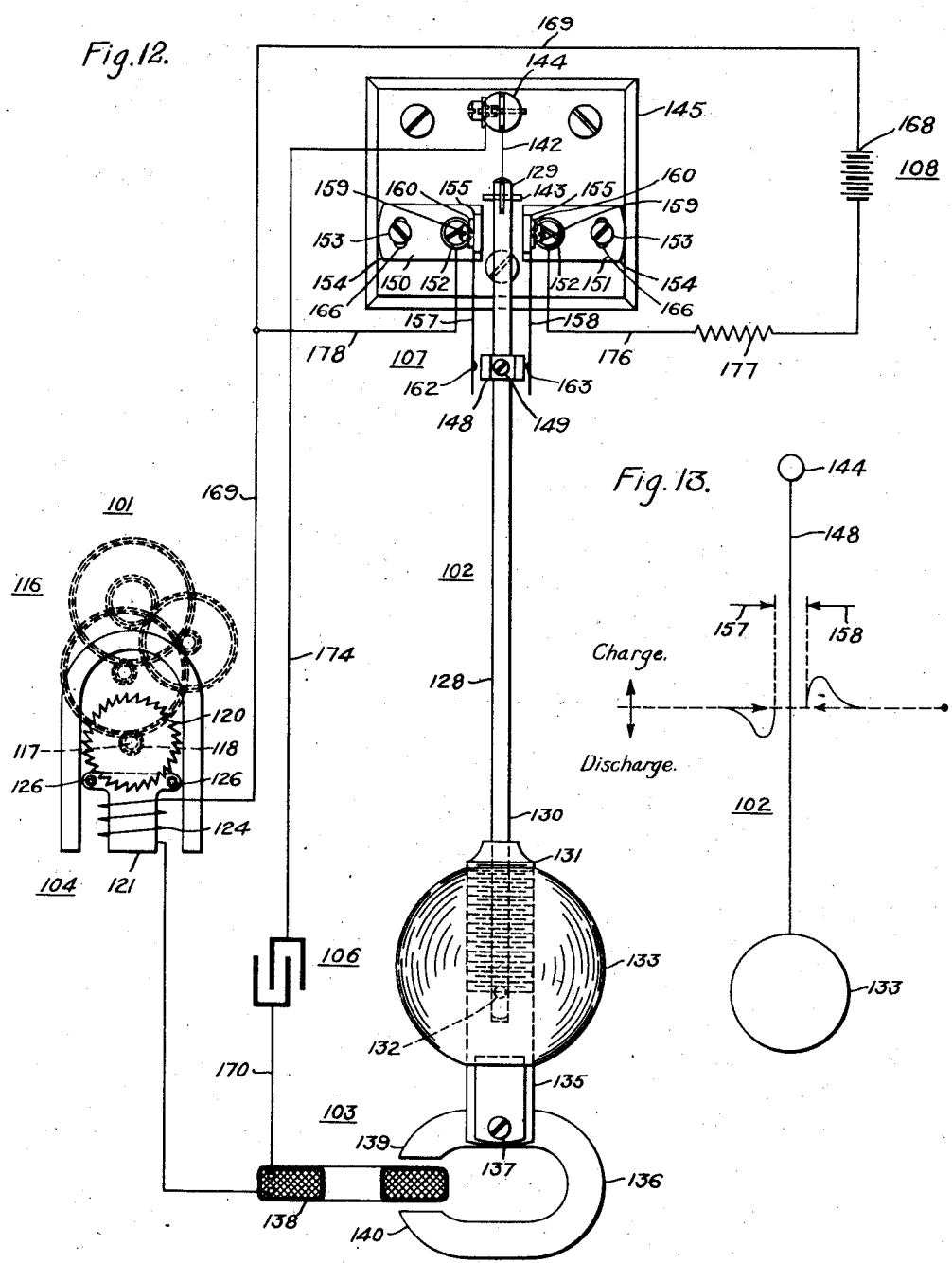

May 23, 1933.  F. CONRAD  1,911,062
ELECTRIC CLOCK
Filed March 17, 1927   7 Sheets-Sheet 6
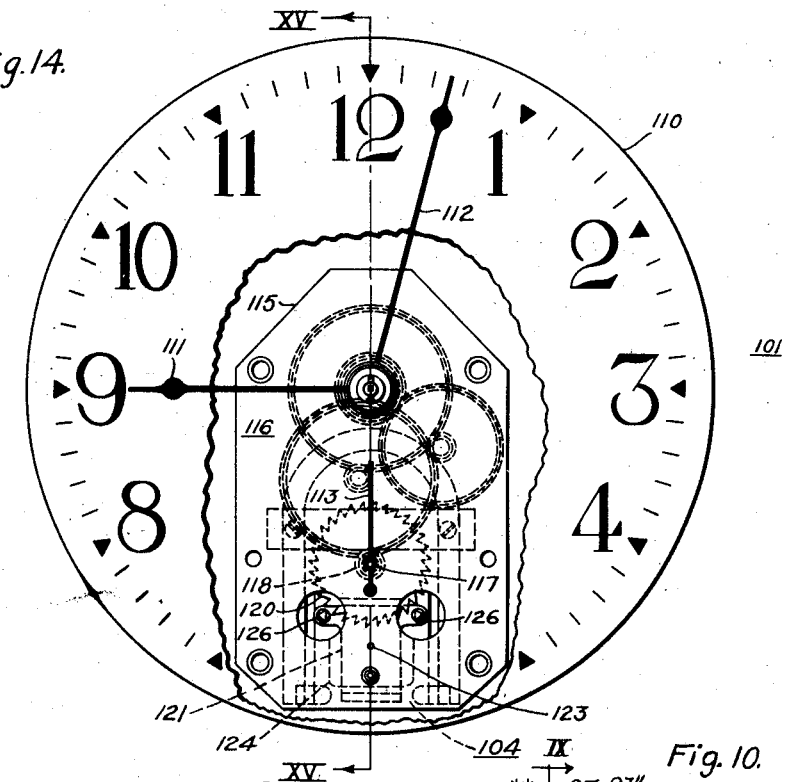
Fig. 14.
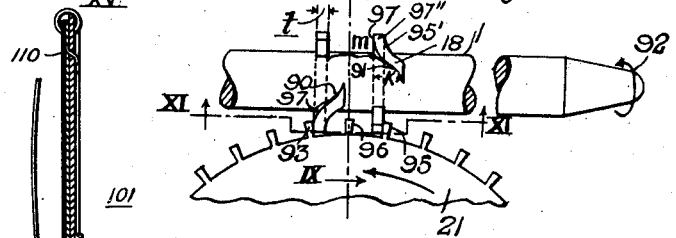
Fig. 10.
Fig. 15.
Fig. 9.
Fig. 11.
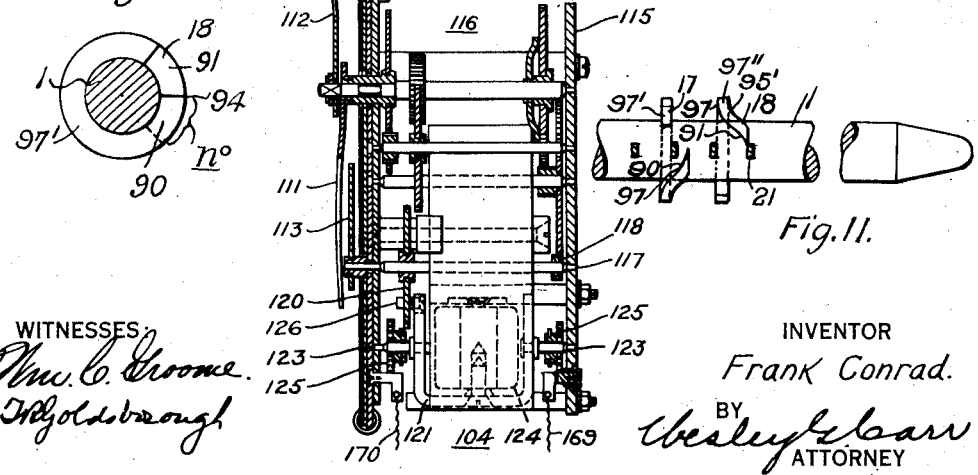
WITNESSES
INVENTOR
Frank Conrad.
BY
ATTORNEY May 23, 1933.  F. CONRAD  1,911,062
ELECTRIC CLOCK
Filed March 17, 1927  7 Sheets-Sheet 7

WITNESSES
Anw. C. Groome.
T. R. Goldsborough

INVENTOR
Frank Conrad.
BY
Ebesley G. Carr
ATTORNEY

Patented May 23, 1933

1,911,062

UNITED STATES PATENT OFFICE

FRANK CONRAD, OF PITTSBURGH, PENNSYLVANIA

ELECTRIC CLOCK

Application filed March 17, 1927. Serial No. 176,061.

My invention relates to electric clocks and similar mechanisms and particularly to time-keeping and controlling structures embodying electrically driven oscillating elements, such as balance wheels or pendulums.

One object of my invention is to provide a device of the above-indicated character that shall operate accurately over long periods of time without requiring attention.

Another object of my invention is to provide a time-keeping or controlling mechanism that shall require a minimum of operating energy.

Another object of my invention is to provide means whereby an oscillating member and a mechanism controlled thereby may be constructed separately as individual elements and may be easily and quickly assembled to produce a complete device.

Another object of my invention is to provide, in a device of the type described, a system of electrical contacts having substantially no inertia.

Another object of my invention is to provide an electrically energized time-dividing mechanism that shall operate accurately over long periods with a power consumption of the order of .001 watts.

Another object of my invention is to provide, in a device of the type described, means for electrically coordinating the power consumption to the mechanism or so-called "windage" losses therein.

Another object of my invention is to reduce the frictional losses in an electrically actuated time-dividing mechanism to a minimum.

Another object of my invention is to provide a mechanism for transforming oscillatory energy into unidirectional energy with minimum losses.

A still further object of my invention is to eliminate, in time-dividing mechanisms actuated through the medium of an oscillatory member, the necessity for utilizing escapement devices of the usual and well known types.

Heretofore, electric clocks and similar mechanisms, controlled as to their time-measuring function by oscillating members having a definite period of oscillation, have been open to many objections. Among the principal objections to such mechanisms may be mentioned the requirement for excessive operating energy, unwieldy and expensive mechanisms producing large friction losses and the inability to accurately measure time over extended periods without constant adjustment. The excessive power demand of electric clocks known to the prior art has been caused by the use of voltages of a very low order, by the failure to restrict the power input to the exact intervals when it is available for doing useful work and by the employment of electrical contact-making devices having appreciable inertia, and by the failure to limit the current to the amount required for operation.

Where voltages of a lower order, two to five volts, for example, have been used, failures were frequently due to the presence of very minute quantities of dust or foreign substances. Such voltages also require high precision contacts for dependable operations and also necessitate current consumption of a higher order to obtain the required energy.

By the present invention, I have successfully eliminated all of the above-mentioned objections and have provided a simple, self-contained, compact, dependably effective unit requiring a minimum of current. I have further provided a time-measuring device that has many other advantages, such as economy of manufacture, ruggedness, durability of construction, and dependable, accurate and economical operation.

Accordingly, in practicing my invention, I provide an oscillating member and means for periodically subjecting such member to magnetic impulses of a definite value, the time interval between the impulses being so controlled by the oscillating member that the magnetic field is set up only at such times as it is doing useful work. I further provide an automatic power limiting device, preferably in the nature of a condenser, and so correlate the capacity of the condenser, the voltage of the source utilized and the mechanical losses in the mechanism that an ordinary dry-cell battery having a potential of the order of 20 volts is capable of operating the device for an extended period of time without substantial error. I have also provided electrical contacts to function substantially without inertia, thus further reducing the power input required.

Among the novel features of my invention are those particularly set forth in the appended claims. The invention in its entirety, however, as well as further objects and advantages thereof, will best be understood by references to the following description of certain specific embodiments, taken in connection with the accompanying drawings, in which Figure 1 is a view, partly diagrammatic and partly structural, illustrating schematically a preferred embodiment of my invention.

Fig. 9 is an enlarged sectional view of the balance-wheel staff, the sectional plane being indicated by the line IX—IX in Fig. 10.

Fig. 10 is an enlarged side view of the balance-wheel staff and a fragment of the cooperating spur-gear, showing the position of the gear after the staff has rotated in the direction of the arrow from its mid-position with respect to the gear.

Fig. 11 is a sectional view on the line XI—XI of Fig. 10 but showing the position of the gear teeth when the staff has oscillated back in the direction opposite to that indicated in Fig. 10 and has then returned again to its mid-position with respect to the spur-gear or toothed wheel.

Fig. 12 is a partially-structural and partially diagrammatic view of a modified form of my invention.

Fig. 13 is a diagrammatic view of a portion of the device shown in Fig. 12, together with curves showing the relation of condenser charge and discharge currents to the contacts of a circuit interrupter shown in Fig. 12.

Fig. 14 is a front view, portions being broken away, of a clock structure adapted to cooperate with that form of my invention illustrated in Fig. 12.

Fig. 15 is a view taken along a line corresponding to the line XV—XV of Fig. 14.

Figure 1:
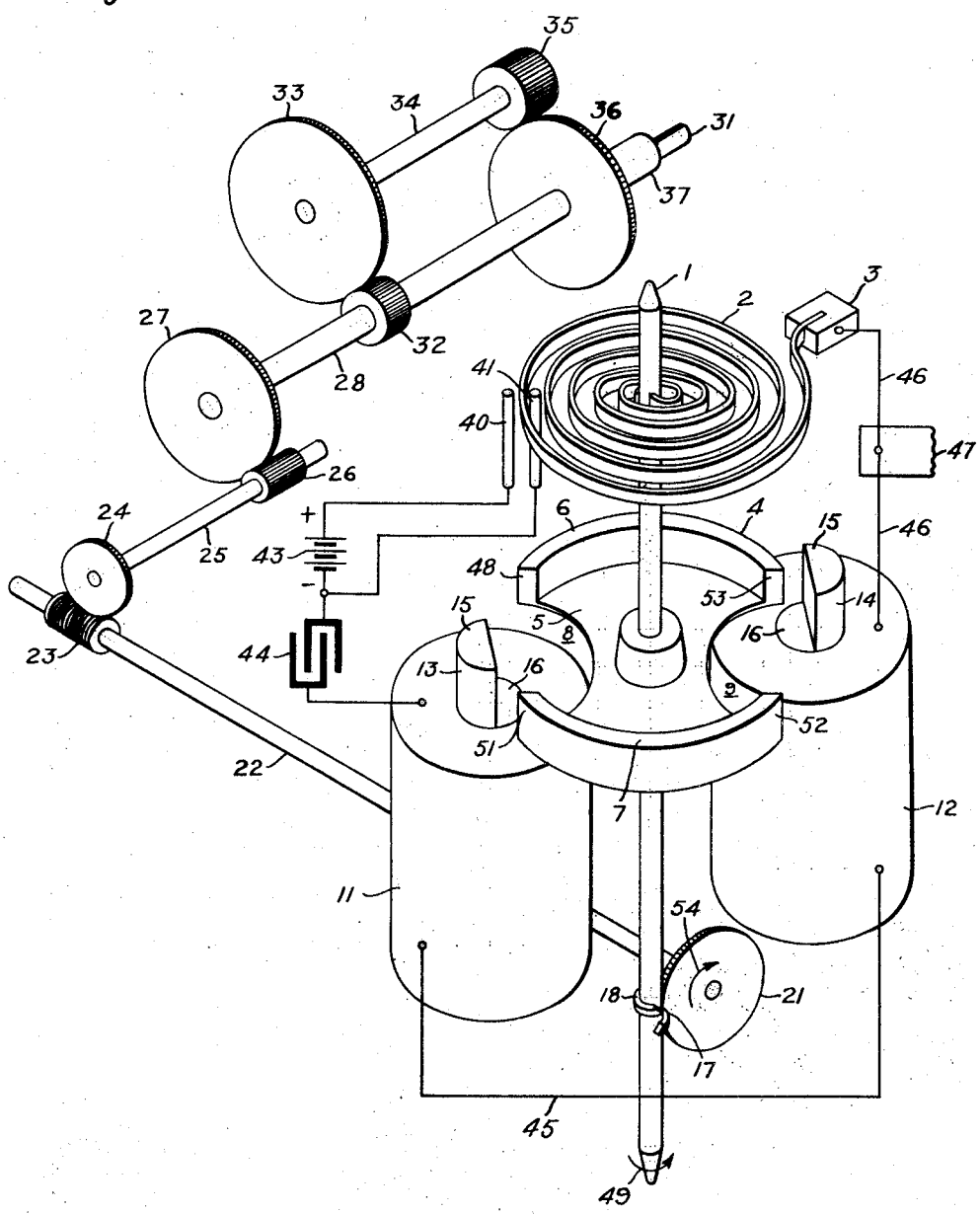

Before describing a preferred actual embodiment of my invention, reference should be made to Fig. 1 for a complete understanding of the underlying principles thereof. Fig. 1 has not been drawn to scale, nor are the elements arranged in the spacial relation they will assume in a commercial embodiment, this figure being what might be termed an idealized view of the elements essential to practicing my invention, the non-essential portions such as bearings, etc., having been omitted.

In Fig. 1, a balance-wheel staff 1 is arranged to be supported at the opposite ends thereof and this staff has affixed thereto a hair spring 2, one end of which is anchored by a holding member 3. The staff 1 also carries an element 4 analogous to a balance wheel. This element, which is preferably not polarized but is made of a magnetizable metal having high permeability, and substantially negligble temperature coefficient of expansion, such as 36% nickel steel, comprises a bottom portion 5 carrying raised circumferential shoulders 6 and 7. Both the shoulders 6 and 7 and the bottom portion 5 are discontinuous circumferentially, a plurality of openings 8 and 9 being provided therein for a purpose which will later be explained.

A plurality of actuating solenoids 11 and 12 are provided, the pole pieces 13 and 14 of which are arranged adjacent to the path of travel of the balance-wheel element 4. Each of these pole pieces is so machined that a vertical portion 15 thereof cooperates with the shoulder portions 6 and 7 of the balance-wheel member, while a horizontal portion 16 thereof cooperates with the bottom portion 5 of the balance-wheel member, in a manner that will be more fully explained.

The balance-wheel staff 1 carries a plurality of screw threaded elements 17 and 18 arranged in operative relation to a spur wheel 21 affixed to a shaft 22, which, at its opposite extremity, carries a worm 23.

The worm 23 meshes with a spur gear 24 affixed to a shaft 25, which also carries a small gear wheel 26. The small gear wheel 26 cooperates with a larger gear wheel 27 carried by a shaft 28, the further extremity 31 of the shaft being arranged to support a minute hand or other indicating device (not shown).

The shaft 28, in addition, carries a small gear wheel 32 which cooperates with a larger gear wheel 33 carried by an idler shaft 34. A small gear wheel 35 is affixed to the end of the idler shaft opposite the large gear wheel 33 and cooperates with a large gear wheel 36 provided with an integral collar 37 and loosely mounted upon the minute-hand shaft 28.

The collar 37 is adapted to carry the hour hand if desirable, the proper speed reduction being obtained through the gear train, including the idler shaft.

A plurality of contact members 40 and 41 are arranged in operative relation to the hair spring 2, the member 40 being connected to one pole of a voltage source 43 and the other member 41 being connected to the opposite pole of the voltage source. For convenience in describing the operation of the device, it is assumed that the pole first referred to is positive and that the second pole referred to is negative, although this specific polarity is not essential.

One terminal of a condenser 44 is connected to the negative pole of the battery 43, and the other terminal of the condenser is connected to a terminal of the solenoid 11. The solenoid 11 is connected, by means of a conductor 45, to the solenoid 12, which, in turn, is connected, by a conductor 46, to the anchoring element 3. As indicated by the fragmentary element 47, the anchoring device, as well as the conductor 46, may be grounded on the frame (not shown) which supports the various mechanisms.

The contact elements 40 and 41, in an actual embodiment of my invention, are carried by a movable insulating member (not shown) which permits of limited angular adjustment thereof around the axis of the balance-wheel staff.

The hair spring 2 is so chosen that it shall give to the balance wheel member 4 the desired natural period of oscillation. In order that the oscillations may be sustained, it is necessary that the balance wheel member shall be subjected to magnetic impulses, properly timed. To this end, I have so arranged the contact elements that element 40 will make contact with the hair spring when it expands by reason of oscillation of the balance wheel element 4, in the direction indicated by an arrow 49, and the contact element 41 will make contact with the hair spring at a definite time during the reverse swing of the element 4.

The instant of each contact is so chosen that it coincides with the instantaneous position of the balance-wheel member when the openings 8 and 9 therein are substantially centrally positioned opposite the pole pieces.

In order that the manner of operation of my invention may be made clear, first assume that the balance-wheel member 4 is swinging in the direction indicated by the arrow and that the openings 8 and 9 are at the instantaneous position just referred to. The hair spring is now making contact with the outer contact element 40, and a current flows from the positive pole of the battery through the contact element 40, the hair spring 2, the solenoids 12 and 11 and charges the condenser 44.

The direction of the solenoid windings is such that the flow of charging current will give to one pole piece a polarity which may be assumed to be north, and to the other pole piece a south polarity, the magnetic circuit being completed through a base member (not shown). Inasmuch as at the instant the magnetic field is set up the openings in the balance wheel member are slightly past the central position with reference to the pole pieces, the end 48 of the shoulder 6 is attracted more by the pole piece 13 than is the end 51 of the opposite shoulder 7. An end 52 of the shoulder 7 is also attracted more by the pole piece 14 than is the end 53 of the shoulder 6, thus subjecting the balance-wheel member 4 to an impulse which tends to cause it to travel faster in the direction it was travelling when the magnetic field was set up.

During the half cycle of oscillation of the balance-wheel member just described, the screw threaded element 18 carried by the staff 1 has made contact with one of the teeth of the spur gear 21 and has advanced it in a direction indicated by an arrow 54 an amount proportional to the pitch of the element, thus communicating an increment of movement to the gear train.

Assume now that the balance-wheel member 4 has rotated to the limit of its travel in the direction indicated by the arrow 49, and that it is returning in the opposite direction by reason of the energy stored in the hair spring. At a certain definite instant during the reverse oscillation, contact will be broken between the hair spring and the outer contact member 40 by reason of the fact that the hair spring is now contracting radially.

An instant later, when the openings 8 and 9 in the balance-wheel member 4 are again centrally positioned opposite the pole pieces, the hair spring 2 makes contact with the inner contact member 41, permitting the condenser 44 to discharge through the solenoid windings in the direction opposite to that of the charging current. This discharge current causes the pole pieces 13 and 14 to assume the opposite polarity and the magnetic field acts on the magnetizable balance-wheel member 4 in the manner previously described.

The magnetic impulse is so timed that the balance wheel member is constrained to keep moving in the direction it was rotating at the instant contact was made between the inner contact member and the hair spring.

During the reverse travel of the balance-wheel staff, the screw threaded member 17 engages the spur wheel 21 and gives it an increment of rotation in the same direction as was given to it by the screw threaded member 18 during the first half cycle of operation. The second increment of rotation is transmitted to the gear train and, eventually, to the indicating means in the same manner as was the first increment.

By arranging the balance wheel member and the peculiarly shaped pole pieces as shown in the drawings, the magnetic field of the pole pieces is doubly effective, the vertical portions 15 of the pole pieces cooperating with the raised shoulder portions 6 and 7 of the balance wheel member, while the horizontal portions 16 of the pole pieces cooperate in a similar manner with the base portion 5 thereof.

When contact is made between the hair spring and the outer member 40, during the swing of the balance-wheel member in the direction indicated by the arrow 49, the condenser 44 receives a full charge. When, therefore, contact between the hair spring and the member 40 is broken during the reverse swing, no voltage exists across the contact and, accordingly, no sparking occurs. Conversely, at the instant the inner contact member 41 touches the hair spring, in order that the condenser may discharge, no sparking will occur, inasmuch as a circuit through the solenoid windings is being made. Also, at the instant when the hair spring leaves the inner contact member, the condenser has become fully discharged and, therefore, no sparking will occur. For these reasons, the contact members and the hair spring as well, may be made of base metals which could not be used in devices known to the prior art on account of excessive sparking at the electrical contacts thereof.

As has previously been explained, the power consumption of a clock constructed according to my invention is extremely minute. The driving force transmitted from the oscillatory member to the gear train connected to the indicating hands is actually much less than the frictional forces brought into play when the hands are moved relative to the shaft 31 and the collar 37, in the event adjustment is required. Since only a very slight force is sufficient to impede or stop the motion of the oscillatory member, it is advisable to provide means whereby adjustment of the hands is prevented from transmitting the slightest movement to the shaft 22.

To this end, I have provided the worm 23 and the gear 24 between the gear train actuating the hands and the prime-mover portion of the device. This arrangement prevents motion from being transmitted from the shaft 31 to the shaft 22, and the hands may, accordingly, be adjusted with the assurance that the oscillations of the balance-wheel member will not be interfered with.

The electrical contact system comprising the members 40 and 41, and the hair spring 2, is substantially inertialess, requiring an inappreciable amount of energy for actuation, while, in all prior art electrical clocks with which I am familiar, the contacts were necessarily large and heavy in order to carry the currents required by such devices.

By the elimination of inertia in the electrical contact system, and by the reduction in friction in all working parts, I have produced a device that is capable of being continuously actuated by minimum energy. The condenser 44 and the voltage source 43 are so chosen and correlated to the size of the actuating solenoids 11 and 12 that the system consumes only the exact amount of energy necessary to overcome the mechanical losses therein. In a preferred commercial embodiment of my invention, the condenser has a capacity of two microfarads, and the battery a voltage of 22 volts.

It can be mathematically shown that, if a condenser of 2 microfarads is charged and discharged once per second from a battery of 22 volts, the average energy consumption is less than .001 watts. This rate of charge and discharge is maintained in the preferred embodiment of my invention referred to above, and the battery will accordingly continue to furnish energy for a length of time substantially equal to its so-called "shelf-life."

As previously pointed out, my invention is capable of many specific embodiments. In order that this disclosure shall be complete, a preferred actual embodiment will now be described.

Figure 7:
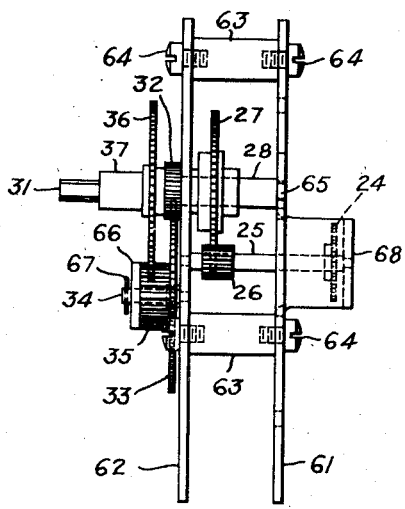
Figs. 7 and 8 are views corresponding to Fig. 3, and illustrating the sectionalizing of the device into a time-dividing, or prime-mover portion and a time-indicating portion.

Referring to Figs. 2 to 8, inclusive, and particularly to Fig. 7, it will be noted that the time-indicating portion of the device comprises substantially the same elements as are illustrated in Fig. 1. A rear plate 61 and a front plate 62 are held in fixed parallel relation by means of a plurality of spacer elements 63 therebetween, a plurality of retaining screws 64 passing through openings in the plates into the ends of the elements in contact therewith. The minute hand shaft 31 passes through an opening in the front plate 62 and a reduced portion 65 thereof is journalled in a small hole in the rear plate 61. The gear 27 is affixed to the shaft 31 intermediate the two plates, and the gear 32 is also affixed thereon immediately adjacent the outer face of the front plate 62.

The gear 36, which is provided with the sleeve 37 for carrying the hour hand, is loosely mounted on the end of the shaft 31, and is meshed with the idler gear 35 carried by the shaft 34 which is fixedly mounted in an opening in the front plate 62. The gear 36 is prevented from slipping off of the shaft 31 by a washer 66 carried by the shaft 34 adjacent the gear 35, the washer being retained by a pin 67 which passes through an opening in the end of the shaft 34. The gears 33 and 35 are preferably made integral, motion being conveyed to the gear 33 by the gear 32.

The shaft 25, which carries the gear 26 meshing with the gear 27, has one end thereof mounted in an opening in the front plate 62, while the other end, on which is affixed the gear 24, is carried by a portion 68 struck up from the rear plate 61.

The shaft 25 is extended backward in the manner shown in order that the gear 24 may come into operative relation with the worm 23 when the time-indicating and time-dividing portions of my device are assembled together.

The prime-mover, or time-dividing portion of my device comprises an upper plate 70 having a turned-up forward edge 71, and a lower plate 72 having a turned down forward edge 73, the two plates being held in fixed parallel relation by means of a plurality of spacer elements 74, 75, and 76, into the opposite ends of which are secured a plurality of retaining screws 77 which pass through openings in the plates 70 and 72.

The upper plate is preferably made of a non-magnetic material, while the lower plate is made of steel, iron, or other material having a fairly high permeability.

The balance wheel staff 1 is supported between adjustable bearing members 79 threaded into the upper and lower plates, respectively, the members being retained in adjusted position by lock nuts 80.

A movable plate 81 of insulating material, such as bakelite or the like, is rotatably mounted on an upwardly extending portion of the upper bearing member 79 and is maintained in position by the lock nut 80. A spring washer is interposed between the lock nut 80 and the insulating member 81 in order to prevent undue wear on the latter, and to provide means for frictionally holding it in position.

The contact members 40 and 41 are carried by an extension 82 of the insulating member 81, and project downwardly through an opening 83 in the top plate 70 into operative relation with the hair spring 2. The opening 83 is sufficiently wide to permit an adequate amount of angular movement of the contact members with reference to the axis of the balance-wheel staff in order to alter the effective length of the hair spring, as is customary for regulation. The contact members, therefore, serve as means for both regulating the period of oscillation of the element 4 and for establishing the electrical circuits previously described in connection with Fig. 1.

The outer extremity of the hair spring 2, is anchored by a pin 84 into an element 85 affixed to the under side of the upper plate 70.

The pole pieces 13 and 14 are provided with threaded openings in their lower ends and are maintained in fixed position between the upper and lower plates by means of screws 86 which pass through openings in the lower plate 72 and seat in the threaded openings in the lower ends of the pole-pieces.

The balance wheel member 4, which is affixed to the staff 1 immediately below the hair spring 2, is given such a diameter that the shoulder portions 6 and 7 thereof will clear the vertical portions 15 of the pole pieces 13 and 14 by one sixteenth of an inch or less, this clearance not being critical.

The actuating solenoids 11 and 12 are mounted loosely upon the respective pole-pieces, one end of the windings being grounded into the frame as shown in Fig. 1. If the device is to be subjected to rough treatment, these solenoids, should preferably be provided with means for preventing movement thereof axially of the pole-pieces, in order that the oscillation of the balance-wheel member 4 shall not be impeded.

A short column 87 is vertically mounted on the base plate 72 by means of a screw 88 which extends through an opening in the base plate and is seated in a threaded opening in the lower end of the column. This column is provided with a transverse opening in which is mounted one end of the shaft 22, the other end of the shaft being supported in an opening in the spacer-element 76.

The spur-gear 21 is mounted on the shaft 22 near the column 87, and engages the screw-threaded elements 17 and 18 carried by the balance-wheel shaft. The worm 23 is carried by the shaft 22 adjacent the spacer element 76 and serves to transmit motion to the gear-train constituting the time-indicating portion of my device.

The magnetic circuit for the actuating solenoids comprises the base plate 72, the pole-pieces 13 and 14 and the oscillatory balance wheel member 4. The latter member is not polarized and, consequently, assumes, by induction, a polarity which causes it to be attracted toward the pole-pieces, irrespective of the instantaneous polarity of the latter.

Figure 8:
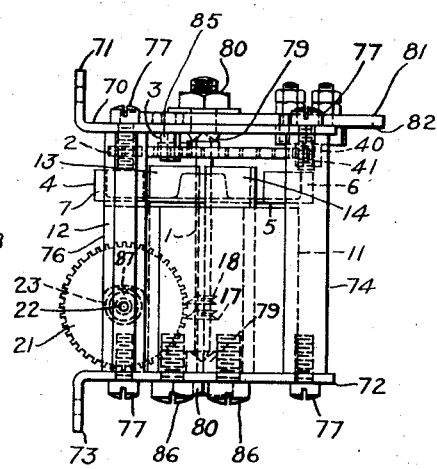
Figure 16:
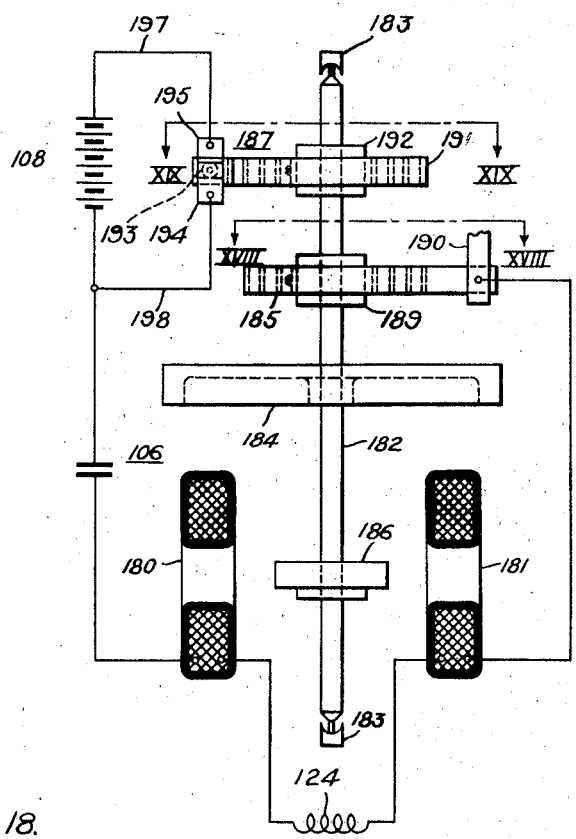
Fig. 16 is a partially structural and partially diagrammatic view of a further modified form of my invention.
Figure 18:
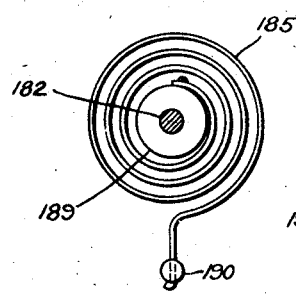
Figs. 18 and 19 are views taken along lines corresponding to the lines XVIII—XVIII and XIX—XIX, respectively, of Fig. 16.

In order that the sectionalizing of my device into time-dividing and time-indicating mechanisms, each capable of being separately manufactured, may be more clearly apparent, attention is called particularly to Figs. 7 and 8.

Figure 2:
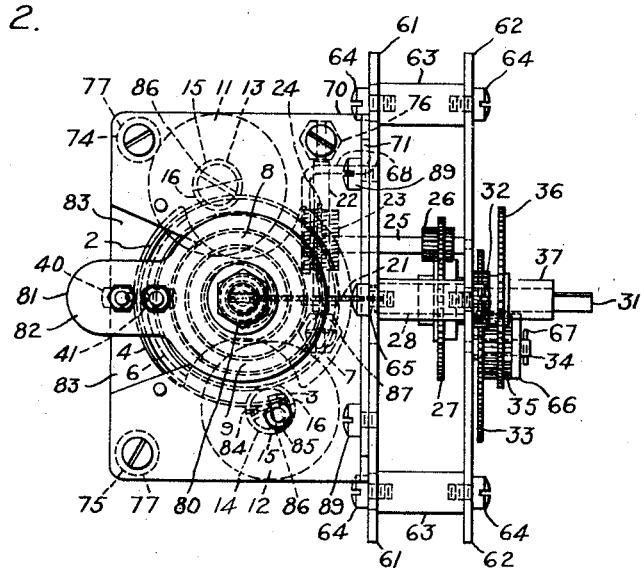
Fig. 2 is a top plan view of a preferred commercial embodiment of my invention.
Figure 3:
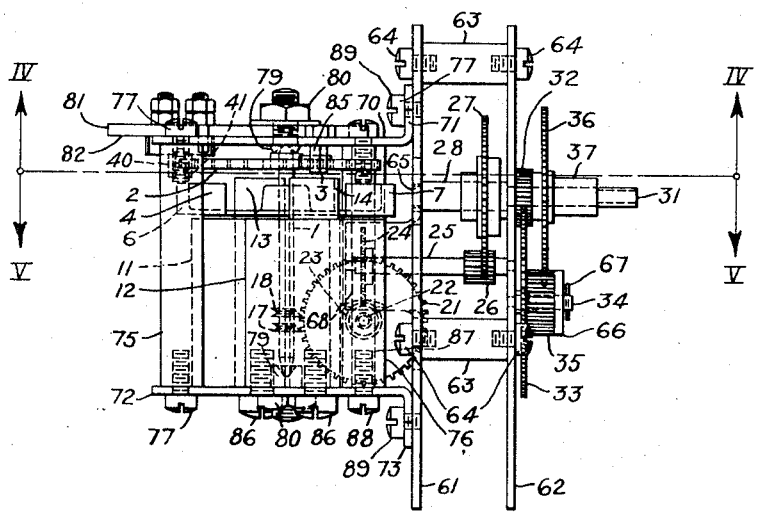
Fig. 3 is a side elevational view of the device illustrated in Fig. 2.
Figure 4:
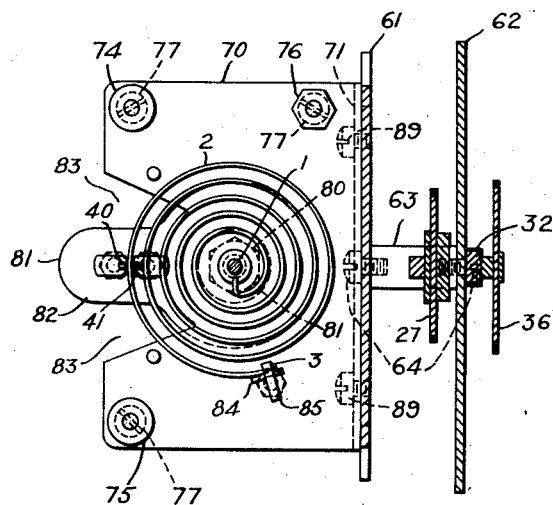
Fig. 4 is a sectional view taken along a line corresponding to the line IV—IV of Fig. 3, as seen from below.
Figure 5:
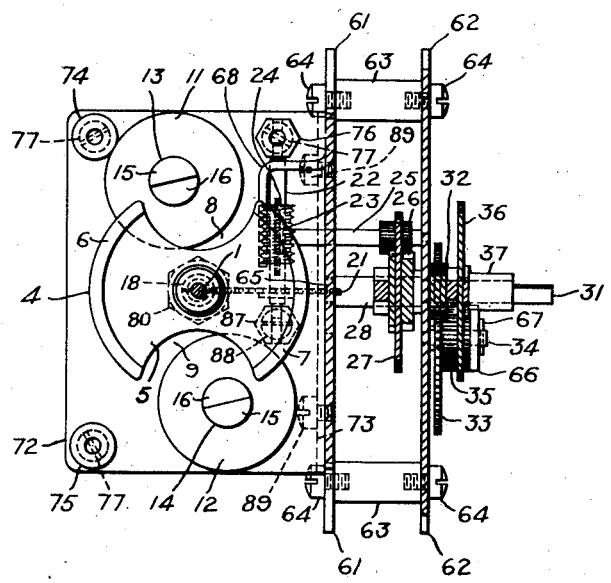
Fig. 5 is a sectional view taken along a line corresponding to the line IV—IV of Fig. 3, looking in the direction indicated by the arrows V—V.
Figure 6:
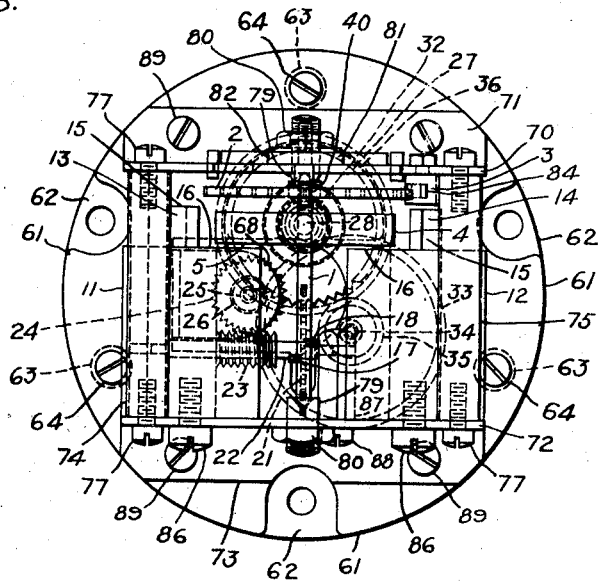
Fig. 6 is a rear elevational view of the device.

Fig. 7 illustrates the appearance of the time-indicating mechanism when disassociated from the time-dividing mechanism by the removal of a plurality of retaining screws 89, shown in Figs. 2 and 3. It is important that the openings provided in the rear plate 61 and the openings in the right-angle portions 71 and 73 of the supporting plates 70 and 72 be accurately positioned, since the act of assembling these elements causes the gear 24 to come into operative relation with the worm 23.

Obviously, slight discrepancies are permissible, the allowable variation from the predetermined positions of the corresponding openings in the various plates being well within the usual manufacturing tolerance.

By constructing the time-indicating and time-dividing portions of my device as separate and individual units, it is possible to greatly reduce the cost of manufacture and assembly. The elements illustrated in Fig. 7 need not be made with the same degree of care as those illustrated in Fig. 8 and, consequently, their manufacture may be entrusted to semi-skilled labor.

By reason of the fact that I have arranged the time-dividing portion of my device to be supported on a separately manufactured chassis and have also arranged the time-indicating mechanism to be separately supported, it is believed obvious that any given time-indicating assembly may be utilized with any other given time-indicating mechanism assembly. The manufacture of these separate units accordingly, may be entrusted to different firms, and the complete device assembled merely by providing the plates with openings in the proper position through which the assembly bolts 89 are inserted.

As shown in Figs. 9, 10 and 11, the screw-threaded elements 17 and 18 on the balance-wheel staff or shaft 1 are provided with short inclined-plane surfaces 90 and 91 respectively. The inclined-plane surface 90 faces in such direction as to push a tooth of the toothed wheel or spur-gear 21 a half tooth-pitch to the left when the balance-wheel shaft 1 rotates in the direction of the arrow 92, in Fig. 10, from its mid-position in which the tips of the inclined-plane surfaces 90 and 91 are approximately in their intermeshed position with respect to the teeth of the toothed wheel 21. After the inclined-plane surface 90 has pushed a tooth to the left, to the position indicated at 93 in Fig. 10, said tooth thereafter moves no further during the continued rotation of the balance-wheel shaft in the same direction as indicated by the arrow 92 in Fig. 10. The amplitude of oscillation of the shaft from its mid-position 94 (Fig. 9) may thus vary between wide limits, without changing the amount of movement of the toothed wheel 21 for each half-oscillation of the balance-wheel shaft 1, provided that the amplitude of oscillation of the shaft, in either direction from its mid-position 94, is at least as great as the circumferential extent $n°$ (Fig. 9) of one of the inclined-plane surfaces 90 or 91. The amplitude of oscillation in either direction from the mid-position 94 is limited only when another tooth 95 (Fig. 10) is engaged by the back portion 95' (Fig. 10) of the other element 18 which carries the other inclined-plane surface 91, the maximum amplitude being thus approximately $(360° - n°)$.

After the balance-wheel shaft reaches the end of its movement in the direction of the arrow 92 shown in Fig. 10, it swings back, and the inclined-plane surface 90, which has pushed the tooth 93 over to the left, now passes freely between this tooth and the next following tooth 96. When the shaft passes its mid-position again, in its back-swing, contrary to the arrow 92 in Fig. 10, or approximately at this point, the other inclined-plane surface 91 pushes against the edge of the tooth 95, and as the shaft continues to move, this inclined-plane surface pushes the tooth 95 over to the left, it being noted that the other inclined-plane member 17 is discontinuous at this point so as to permit the tooth 96 to clear it and move to the left when the tooth 95 is pushed to the left by the inclined-plane surface 91. The position of the teeth of the toothed wheel 21 after the balance-wheel shaft has completed its movement in the direction opposite to the arrow 92 of Fig. 10, and when the balance-wheel shaft has returned again to its mid-position, is indicated in Fig. 11.

Each of the inclined-plane surfaces 90 and 91 preferably terminates, after pushing a tooth forward, to the left, in a surface 97 of an annular ring-segment 97' and 97'' respectively, said annular ring-segment surfaces being substantially normal to the balance-wheel shaft 1.

It will be noted, in Fig. 10, that the tooth 96 occupies a position in the approximate center of the space $m$ between the two ring-segments 97' and 97'', while the two adjacent teeth 93 and 95 occupy positions on the outer sides of these two ring-segments. The center-line of this space $m$ thus passes approximately through the middle of the tooth 96. In order, therefore, for this tooth 96 to clear the inclined-plane surface 90 when the latter moves backwardly after pushing the tooth 93 to the left, it is thus necessary for this space $m$ to be greater than the thickness of the tooth 96 plus twice the axial extent $k$ of one of the inclined-plane surfaces 90 or 91 minus twice the thickness $t$ of one of the ring-segments 97' or 97''.

In order that the inclined-plane surface 90 or 91 may rotate the toothed wheel 21 to the left by an amount equal to one-half of the tooth-pitch distance between the center-lines of two successive teeth of said toothed wheel, for each advancing movement of either inclined-plane surface, it is obviously necessary that said axial extent $k$ of each inclined-plane surface shall be somewhat greater than one-half of said tooth-pitch distance.

In order to make the oscillating-shaft gear-drive operate, as just described, it is necessary to provide means for holding the toothed wheel 21 against any material back-movement when the inclined-plane surface 90 or 91 is moving backwardly away from a tooth. Such means is shown in Fig. 1, in the second worm drive 23—24 which is an ordinary non-reversible gear preventing the resilient forces or backlash of the time gear-train 26—36, or the operation of setting the clock hands by moving them backwardly, from transmitting the slightest backward movement to the toothed wheel 21.

It will be noted, from the foregoing explanation, that I have provided a means for converting a periodic oscillating movement into a step-by-step rotational movement in a single predetermined direction, and that I have made the amount of this step-by-step rotational movement independent, within wide limits, of the amplitude of oscillation of the oscillating or timing member 1. This is important in balance-wheel mechanisms in order to insure that the time-keeping function is not affected by changes in the amplitude of oscillation of the balance-wheel.

In order that it may be clearly apparent that my invention is capable of still further modifications, attention should be directed by Figs. 12 to 19. As shown in Figs. 12 to 15, the device may comprise, in general, a clockwork or other mechanism 101, an oscillating or pendulum structure 102, a device 103 for imparting impulses to the pendulum, a device 104 for imparting impulses to the mechanism 101, a condenser 106, a circuit-interrupter or contact-making-and-breaking device 107 and a source of electromotive force 108, such as an ordinary dry-cell battery.

The mechanism 101, for which other mechanism may be substituted and which constitutes no part of my invention, except insofar as its elements or similar elements may be necessary in cooperation with a preferred form of the invention, comprises a usual dial or face plate 110, hour, minute and second hands 111, 112 and 113, respectively, a supporting frame structure 115 and a usual gear train or mechanism 116.

The impulse-imparting mechanism 104, by which the above-mentioned mechanism is operated, comprises a shaft 117 upon which are mounted the second hand 113, a pinion 118 for directly transmitting movement to the gear train 116 and a ratchet wheel 120. A rocking-pawl member 121, pivotally mounted on the frame 115 by trunnions 123, carries an operating coil 124 therefor to which current is supplied through spiral conducting elements or springs 125. Actuating teeth or dogs 126 on the pawl 121 alternately engage the teeth on the ratchet 120 when the coil 124 is operating.

The pendulum structure 102 comprises a rod portion 128, a slotted upper-end portion 129 and a lower-end portion 130 on which an enlarged cylindrical member 131 is mounted and secured by a pin 132. A weight or ball member 133 is adjustably screw-threadably mounted on the member 131.

A bifurcated lower end portion 135 of the cylindrical member 131 receives one side of a permanent magnet member 136, preferably of substantially C-shape, that is secured in position, by a screw 137 and constitutes one element of the impulse-imparting device 103.

The device 103 further comprises a coil element 138, preferably of relatively thin pancake or toroidal form, adapted to enter a relatively narrow air gap between pole portions 139 and 140 of the magnet 136.

A relatively thin leaf-spring member 142, that is strong in tension and delicate in lateral flexure, is provided with enlargements at its ends, one of which fits into the slotted end 129 of the rod 128 to which it is secured by a pin 143, and the other of which similarly fits and is secured to a supporting stud or binding post 144, the latter being mounted on a supporting base member or block 145, of insulating material.

The circuit interrupter 107 comprises a contact member 148, preferably in the form of a ring or annulus surrounding the rod 128 and secured thereto by a screw 149.

Terminal members 150 and 151, secured to the block 145 by screws 152 and 153, are preferably of substantially L-shape, each having an arm 154 lying in parallel-plane relation to the face of the block 145 and an arm 155 extending normal to said face.

Extremely delicate conducting arms 157 and 158, preferably of flat-strap or leaf-spring form and character, are secured, at the upper ends thereof, to the arms 155 of the terminal members 150 and 151, respectively, as by screw-and-washer-elements 159 and 160. The arms 157 and 158 lie in substantially parallel-plane relation on opposite sides of the contact member 148, in the central or inoperative position of the latter, and are provided with contact portions 162 and 163, respectively, for engagement with the member 148 during the swing of the pendulum. The contact portions 162 and 163 are preferably formed by indenting the members 157 and 158.

The spaces between the contact portions 162 and 163 and the contact member 148 may be adjusted by moving the terminal members 150 and 151, respectively, about the screws 152, as pivots, and locking the terminal members in adjusted positions by the screws 153 which extend through arcuate slots 166 in the arms 154 for this purpose.

The electrical circuit for the above-described apparatus extends from one terminal 168 of the battery 108, through conductor 169, coil 124, coil 138, conductor 170, condenser 106, conductor 174, binding post 144, leaf-spring 142, a portion of the rod 128, contact member 148, arm 158, a conductor 176 and a balancing resistor 177, to the opposite terminal of the battery 108. The above-traced circuit is closed, when the pendulum rod 128 swings to the right, as viewed in Fig. 12, to engage the contact member 148 and the detent or contact portion 163 on the arm 158.

When the pendulum swings beyond its central position to the left, the above-described circuit is broken, and a shunt or closed circuit is established by the contact member 148 which extends from the flexible arm 157 through terminal member 150, conductor 178, a portion of the conductor 169, the coil 124, the coil 138, condenser 106, conductor 174, binding post 144, leaf-spring 142 and a portion of the rod 128 to the contact member 148.

In operation, when the pendulum swings to the right to close the circuit above described, a single voltage impulse is simultaneously impressed from the battery 108 across the condenser 106 the coil 124 and the coil 138. This operation at once charges the condenser 106, actuates the pawl 121 and causes the coil 138 to impart an impulse, in one direction, to the magnet 136, and, consequently, the pendulum 102. When the pendulum 102 swings beyond its central position in the reverse direction, or to the left, as viewed in the drawings, the above-described circuit is broken, and the aforementioned shunt circuit established. This operation discharges the condenser 106 through the coils 124 and 138 to repeat actuation of the pawl 121 and to give another impulse, in the opposite direction, to the magnet 136 and pendulum 102.

Since, during the right-hand swing of the pendulum, the condenser becomes fully charged, when the pendulum swings backward from its right-hand position toward its central position, where the contact members 148 and 158 separate, there is no voltage at the contacts and no current to break. Sparking will, therefore, not occur at these contacts.

Similarly, at the instant the contact member 148 engages the contact member 157, a circuit is being closed, and no sparking occurs.

However, engagement of the contact members 148 and 157 completes the shunt circuit above described to discharge the condenser 106 and, consequently, when the pendulum again swings to the right from its left-hand position there is no voltage and no current to cause sparking when the contact members 148 and 157 separate. When the contact members 148 and 158 again engage, there will be no sparking when the charging circuit is closed.

The current variations in the above-described operations are illustrated diagrammatically, by curves, in Fig. 13, wherein it is shown that the current values are zero at the instants of opening both the charging and the discharging circuits.

In view of the above facts, a battery of relatively high voltage and low current values may be employed where low voltage and high current values have been heretofore considered necessary.

In the impulse-imparting device 103, the force acting on the pendulum is approximately proportional to the product of the strength of the permanent magnet 136 and the ampere turns in the coil 138. The same force may be obtained by a strong magnet and a weak coil or, conversely, a weak magnet and a strong coil.

As the permanent magnet swings with the pendulum, its attractive force may react with external magnetic bodies. This feature may be utilized in various ways, such as operating a relay, but, in the present instance, to prevent adversely influencing the pendulum period, I prefer to have the permanent magnet relatively weak, with nearly closed magnetic circuit, and to obtain the operating force by a corresponding strong coil.

Further, by reason of the fact that the contact members are not required to break strong currents and are, therefore, not required to be engaged with any great force, the resilient arms 157 and 158 may be extremely delicate to impose the least possible load on the pendulum.

In the form of my invention shown in Figs. 16 to 19, inclusive, in which corresponding parts are designated by corresponding reference characters, the only difference in the electrical circuits resides in the substitution of two coils 180 and 181 for the coil 138.

However, instead of the pendulum mechanism of Figs. 12 to 15, inclusive, the device of Figs. 16 to 19 is a balance-wheel mechanism comprising a shaft 182, bearings 183 therefor, a balance wheel 184, a spiral or torsion spring 185, usual with devices of this character, an armature magnet 186, corresponding to the magnet 136 of the first described form of my invention shown in Figs. 12 and 15, inclusive, and mounted on the shaft 182, and a special contact-making mechanism 187 corresponding to the device 107 of the pendulum structure.

The spring 185 is connected, at its inner end, to a bushing or collar 189 on the shaft 182 and, at its outer end, to a stationary element 190 and co-operates, in a usual manner, with the balance wheel 184, which is adapted to oscillate, with the shaft 182, about the longitudinal axis of the latter.

The contact-making mechanism 187 comprises a movable spring contact member 191 in the form of a spiral spring, which corresponds to the movable contact member 148 of the above-described pendulum device.

The spring 191 is connected, at its inner end, to a collar or bushing 192, on the shaft 182, and is provided, at its outer end, with contact portions 193 for engagement with stationary contact members 194 and 195. By this constrution, the spring 191 moves bodily with the shaft 182 between the stationary contact members 194 and 195 but the outer end of the spring is held stationary while the remainder thereof is wound or unwound in accordance with the degree of oscillation of the shaft 182 greater than necessary to move the portions 193 from one of the stationary contact members 194 and 195 to the other.

Thus, in contradistinction to the pendulum structure in which the greater movement of the pendulum is taken up by the resilient arms 157 and 158 on the stationary parts, the greater movement of the shaft 182 is taken up by the resilient movable contact member 191.

Figure 17:
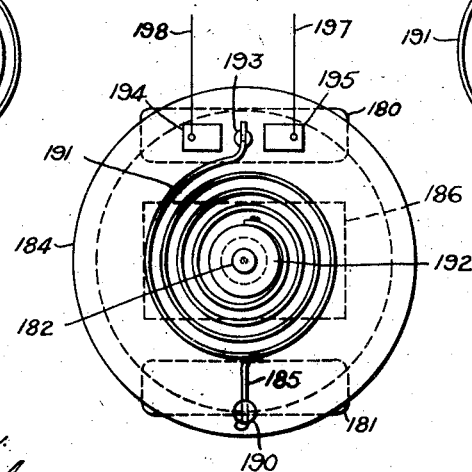
Fig. 17 is an end view of the device shown in Fig. 16, as seen from above.
Figure 19:
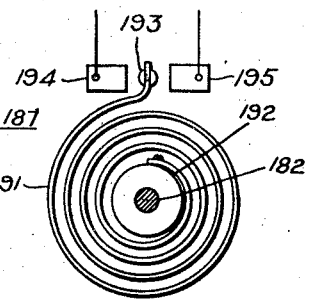

In operation, when the balance wheel 184 oscillates in the clockwise direction, as viewed in Fig. 17, the contact portion 193 engages the contact member 195 to complete a circuit through a conductor 197, battery 108, condenser 106, coil 180, coil 124, coil 181, stationary element 190, spring 185 and shaft 182 to the spring 191.

During this operation, the magnet 186 is oscillated to cause its ends to approach the coils 180 and 181 so that, when the above-mentioned circuit is completed, the condenser 106 is charged, the coil 124 is energized to actuate the pawl 121 (shown in Figs. 12, 14 and 15), or similar device, and the coils 180 and 181 are energized to influence the magnet 186, similarly to the manner in which the coil 138 influences the magnet 136 of the pendulum structure.

In the reverse direction of oscillation of the balance wheel and shaft, the contact portion 193 engages the contact member 194 to form a closed circuit through a conductor 198, the condenser 106, the coil 180, the coil 124, the coil 181, the stationary element 190, the spring 185 and the shaft 182 to the spring 191. Thus, during discharge of the condenser 106, the coils 180 and 181 are again energized to affect the magnet 186.

The above features cooperate to provide a highly efficient mechanism that is very economical to operate, that requires substantially a minimum of attention over long periods of time and that is a substantial improvement in other respects over similar mechanisms heretofore employed.

I claim as my invention:

1. In an electrically actuated time-indicating system, time-dividing means, time indicating means, actuating means therefor comprising an inductor cooperating with a magnetizable oscillatory element, a power supply circuit for said inductor comprising a voltage source and means for measuring current impulses, and means for simultaneously varying the period of said oscillatory element and controlling the action of said measuring means.

2. In an electrically actuated time-indicating device, an oscillatory element, electromagnetic means for compensating frictional losses in said element, and electrically-associated means whereby the period of oscillation of said element and the action of said electromagnetic means thereon may be simultaneously varied.

3. In an electrically actuated timing device, an oscillatory member, electromagnetic actuating means therefor, and electrically-associated means for simultaneously varying the period of said oscillatory member and for completing a circuit including said actuating means.

4. An electrically actuated prime mover comprising an oscillatory magnetizable element having different reluctances at different cross-sections thereof, means tending to give said element a definite oscillatory frequency, electromagnetic means for subjecting said element to periodic magnetic impulses and means whereby the oscillatory period may be varied and the magnetic impulses controlled simultaneously.

5. An electrically actuated prime mover including an oscillatory magnetizable member having varying reluctance, means for subjecting said member to periodical electromagnetic impulses to cause it to oscillate, a shaft member movable in accordance with the movement of said oscillatory member and having a right-hand and a left-hand thread thereon, and a rotatable member including a gear member operatively cooperating with the threads on said shaft member and adapted to be moved in only one direction by movement of said shaft member regardless of the direction of movement of said shaft member.

6. In an electrically actuated clock, an oscillatory element of the nature of a balance wheel, electric actuating means therefor, time-indicating means and a gear train for converting the oscillations of said element into continuous movement of said indicating means, said gear train including a member movable in opposite directions, a member movable in one direction in response to movement of said first member regardless of the direction of movement thereof, and means for preventing the movement of said indicating means by external forces from transmitting motion to said balance wheel.

7. In an electrically actuated clock, electromagnetic time-dividing means and time-indicating means connected thereto through a gear train, said train including a member movable in opposite directions, a member movable in one direction in response to movement of said first member regardless of the direction of movement thereof, and means for preventing the application of external power to said indicating means from interfering with the functioning of said time-dividing means.

8. In an electrically actuated timing mechanism, a balance wheel mounted to oscillate about its axis, driving means therefor comprising an electromagnetic device positioned to impart magnetic energy to said wheel, and means for energizing said electromagnetic device during a fraction only of each half-period of the oscillations.

9. In an electrically actuated timing mechanism, a balance wheel mounted for oscillatory motion about its axis in an air gap between itself and an electromagnetic pole to periodically vary the reluctance of said gap, means for periodically energizing said electromagnet at times when the reluctance of said path is diminishing, said means including a current measuring device in the nature of a condenser.

10. As an article of manufacture, a balance-wheel element comprising the actuating mechanism of a timing device and having a base-portion of magnetizable material and a raised rim-portion of magnetizable material, the rim-portion being discontinuous circumferentially.

11. In combination, a balance-wheel element for a time dividing device, comprising a base portion, and a raised rim-portion entirely of magnetizable material, the magnetizable material of said rim-portion being discontinuous circumferentially, and an electro-magnetic device, for moving said balance wheel, having a pole-piece arranged to cooperate with both of said portions.

12. In combination, a balance wheel element comprising a base-portion and a raised rim-portion, and an electromagnetic device therefor having a pole-piece arranged to cooperate with both of said portions.

13. A prime mover including an oscillatory member, means for subjecting said member to periodical impulses to cause it to oscillate, a shaft member movable in accordance with the movement of said oscillatory member and having a right-hand and a left-hand thread thereon, and a rotatable member including a gear member operatively cooperating with the threads on said shaft member and adapted to be moved in only one direction by movement of said shaft member regardless of the direction of movement of said shaft member.

14. A time mechanism comprising a timing shaft, driving-mechanism for causing said timing shaft to oscillate periodically through less than $(360°-n°)$ in each direction from its mid-position, a toothed wheel member mounted for rotation in a plane including said timing shaft, the teeth of said toothed wheel extending close to said timing shaft, a right-hand worm-tooth section and an axially displaced left-hand worm-tooth section on said timing shaft, said worm-tooth sections presenting inclined-plane surfaces for engagement with the teeth of said toothed wheel to push the wheel around always in the same predetermined direction, as the timing shaft oscillates, each of said inclined-plane surfaces having a circumferential extent of $n°$, $n$ being less than 180, each of said inclined-plane surfaces being discontinuous opposite a sufficient part of the circumferential extent of the other inclined-plane surface to permit rotational movement of said toothed wheel under the influence of the advancing movement of said other inclined-plane surface against the edge of a tooth of said toothed wheel, the space between two successive teeth of said toothed wheel being greater than the axial extent of one of said inclined surfaces, so as to enable each of said inclined surfaces, upon the reverse movement thereof, to move away from the edge of the tooth which it had previously moved in said predetermined direction and to clear the next following tooth of the toothed wheel, and a time gear train driven by said toothed wheel member and including means closely associated with said toothed wheel member for preventing said wheel from losing any material portion of its gained movement upon said reverse movement of either inclined-plane surface.

15. A time mechanism comprising a timing shaft, driving-mechanism for causing said timing shaft to oscillate periodically through less than $(360-n°)$ in each direction from its mid-position, a toothed wheel member mounted for rotation in a plane including said timing shaft, the teeth of said toothed wheel extending close to said timing shaft, and means for causing said timing shaft to advance said toothed wheel a predetermined fixed amount in the same predetermined direction for each complete oscillation of said timing shaft regardless of the amplitude of oscillation of said timing shaft between the amplitude-limits of $n°$ and the aforesaid maximum amount less than $(360°-n°)$, in each direction from its aforesaid mid-position, said means comprising a right-hand worm-tooth section and an axially displaced left-hand worm-tooth section on said timing shaft, said worm-tooth sections presenting inclined-plane surfaces for engagement with the teeth of said toothed wheel to push the wheel around always in the same predetermined direction, as the timing shaft oscillates, each of said inclined-plane surfaces having a circumferential extent of $n°$, $n$ being materially less than 180, each of said inclined-plane surfaces terminating, after pushing a tooth forward in said predetermined direction, in a surface of an annular ring-segment substantially normal to the timing shaft, each of said inclined-plane surfaces and its associated ring-segment surface being discontinuous opposite a sufficient part of the circumferential extent of the other inclined-plane surface to permit rotational movement of said toothed wheel under the influence of the advancing movement of said other inclined-plane surface against the edge of a tooth of said toothed wheel, the space between the two ring-segments being greater than the thickness of one tooth of said toothed wheel plus twice the axial extent of one of said inclined-plane surfaces minus twice the thickness of one of said ring-segments, so that one tooth of said toothed wheel may occupy the approximate center of said space between ring-segments and still clear the inclined-plane surface when the latter moves backwardly after having pushed a tooth in said predetermined direction, the axial extent of one of said inclined-plane surfaces being greater than one-half of the tooth-pitch distance between the center-lines of two successive teeth of said toothed wheel, so that the inclined-plane surface will advance the toothed wheel one half of said tooth-pitch distance each time said inclined-plane surface advances against the edge of a tooth, and the space between two successive teeth of said toothed wheel being greater than the axial extent of one of said inclined surfaces, so as to enable each of said inclined surfaces, upon the reverse movement thereof, to move away from the edge of the tooth which it had previously moved in said predetermined direction and to clear the next following tooth of the toothed wheel, a non-reversible driving gear mechanism driven by said toothed wheel whereby said toothed wheel cannot lose all of its gained movement upon said reverse movement of either inclined surface, and an additional time gear train driven by said non-reversible driving gear mechanism.

16. In a mechanism for converting oscillatory movement into step-by-step rotary movement, the combination with a primary driving shaft, and means for causing said primary driving shaft to oscillate periodically through less than $(360°-n°)$ in each direction from its mid-position, of a toothed wheel member mounted for rotation in a plane including said primary driving shaft, the teeth of said toothed wheel extending close to said primary driving shaft, a right-hand worm-tooth section and an axially displaced left-hand worm-tooth section on said primary driving shaft, said worm-tooth sections presenting inclined-plane surfaces for engagement with the teeth of said toothed wheel to push the wheel around always in the same predetermined direction, as the primary driving shaft oscillates, each of said inclined-plane surfaces having a circumferential extent of $n°$, $n$ being less than 180, each of said inclined-plane surfaces being discontinuous opposite a sufficient part of the circumferential extent of the other inclined-plane surface to permit rotational movement of said toothed wheel under the influence of the advancing movement of said other inclined-plane surface against the edge of a tooth of said toothed wheel, the space between two successive teeth of said toothed wheel being greater than the axial extent of one of said inclined surfaces, so as to enable each of said inclined surfaces upon the reverse movement thereof, to move away from the edge of the tooth which it had previously moved in said predetermined direction and to clear the next following tooth of the toothed wheel, and means closely associated with said toothed wheel member for preventing said wheel from losing any material portion of its gained movement upon said reverse movement of either inclined-plane surface.

17. In a mechanism for converting oscillatory movement into step-by-step rotary movement, the combination with a primary driving shaft, and means for causing said primary driving shaft to oscillate periodically through less than $(360°-n°)$ in each direction from its mid-position, of a toothed wheel member mounted for rotation in a plane including said primary driving shaft, the teeth of said toothed wheel extending close to said primary driving shaft, and means for causing said primary driving shaft to advance said toothed wheel a predetermined fixed amount in the same predetermined direction for each complete oscillation of said primary driving shaft regardless of the amplitude of oscillation of said primary driving shaft between the amplitude-limits of $n°$ and the aforesaid maximum amount less than $(360°-n°)$, in each direction from its aforesaid mid-position, said means comprising a right-hand worm-tooth section and an axially displaced left-hand worm-tooth section on said primary driving shaft, said worm-tooth sections presenting inclined-plane surfaces for engagement with the teeth of said toothed wheel to push the wheel around always in the same predetermined direction, as the primary driving shaft oscillates, each of said inclined-plane surfaces having a circumferential extent of $n°$, $n$ being less than 180, each of said inclined-plane surfaces being discontinuous opposite a sufficient part of the circumferential extent of the other inclined-plane surface to permit rotational movement of said toothed wheel under the influence of the advancing movement of said other inclined-plane surface against the edge of a tooth of said toothed wheel, the space between the two ring-segments being greater than the thickness of one tooth of said toothed wheel plus twice the axial extent of one of said inclined-plane surfaces minus twice the thickness of one of said ring-segments, so that one tooth of said toothed wheel may occupy the approximate center of said space between ring-segments and still clear the inclined-plane surface when the latter moves backwardly after having pushed a tooth in said predetermined direction, the axial extent of one of said inclined-plane surfaces being greater than one half of the tooth-pitch distance between the center-lines of two successive teeth of said toothed wheel, so that the inclined-plane surface will advance the toothed wheel one half of said tooth-pitch distance each time said inclined-plane surface advances against the edge of a tooth, and the space between two successive teeth of said toothed wheel being greater than the axial extent of one of said inclined surfaces, so as to enable each of said inclined surfaces, upon the reverse movement thereof, to move away from the edge of the tooth which it had previously moved in said predetermined direction and to clear the next following tooth of the toothed wheel, a non-reversible driving gear mechanism driven by said toothed wheel whereby said toothed wheel cannot lose all of its gained movement upon said reverse movement of either inclined surface, and an additional member driven by said non-reversible driving gear mechanism.

18. In a mechanism for converting movement back and forth in opposite directions into step-by-step movement in a single predetermined direction approximately at right angles thereto, the combination with a driving member, and means for causing said driving member to move back and forth in opposite directions on either side of a mid-position, of a toothed driven member disposed with its teeth close to said driving member, said teeth following one after another in a direction approximately at right angles to said back-and-forth movement of said driving member, a pair of projecting members on said driving member, one of said projecting members presenting a short inclined-plane surface for engagement with the edge of a tooth of said toothed member for pushing the latter to one side with respect to the driving member when said driving member moves in one direction from its aforesaid mid-position, the other of said projecting members presenting a short inclined-plane surface for engagement with the edge of a tooth of said toothed member for pushing the latter to the same side with respect to the driving member when said driving member moves in the opposite direction from its aforesaid mid-position, the space between two successive teeth of said toothed member being sufficient to receive one of said projecting members between them, the pair of projecting members being displaced laterally with respect to said back-and-forth movement by a spacing sufficient to accommodate two teeth of said toothed member, and an additional driven member connected to said toothed member and including means for preventing said toothed member from losing any material portion of its gained movement when either projecting member moves backwardly after its inclined surface has pushed a tooth in said predetermined direction.

In testimony whereof, I have hereunto subscribed my name this 16th day of March, 1927.

FRANK CONRAD.